(No Model.)

W. H. THOMAS.
WAGON BED LIFTER.

No. 312,038. Patented Feb. 10, 1885.

WITNESSES
R. W. Bishop.
O. B. Turpin.

INVENTOR
Wm. H. Thomas
By R. S. & A. P. Lacey,
ATTYS.

UNITED STATES PATENT OFFICE.

WILLIAM H. THOMAS, OF FULTON, MISSOURI.

WAGON-BED LIFTER.

SPECIFICATION forming part of Letters Patent No. 312,033, dated February 10, 1885.

Application filed December 4, 1884. (No model.)

*To all whom it may concern:*

Be it known that I, WILLIAM H. THOMAS, a citizen of the United States, residing at Fulton, in the county of Callaway and State of Missouri, have invented certain new and useful Improvements in Wagon-Bed Lifters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to wagon-body lifters, and has for its object to provide a device by which the body may be easily elevated from the running-gear, and by which the latter may serve, when drawn out, to further elevate the said body, in the manner hereinafter more fully described and claimed.

Figure 1:
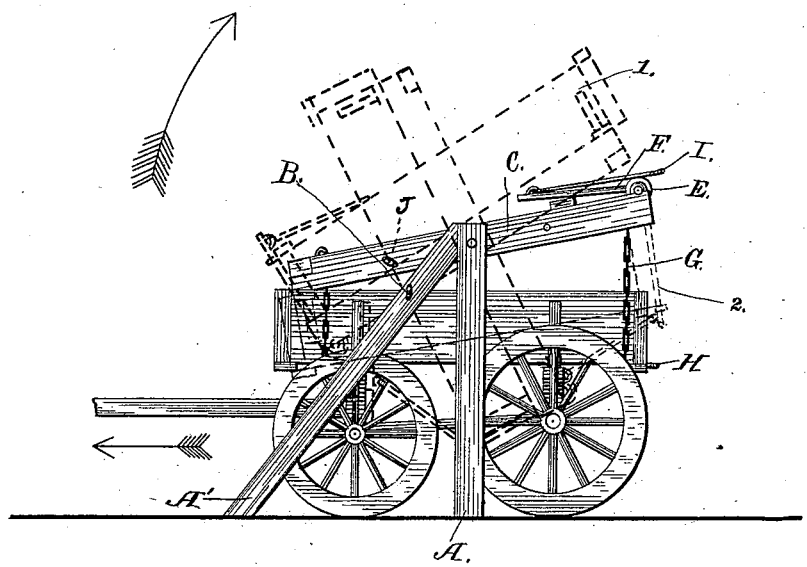
Figure 2:
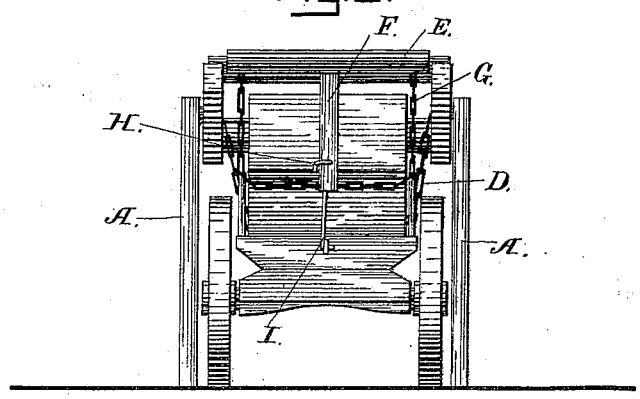

In the drawings, Figure 1 is a side and Fig. 2 a rear view of my apparatus with a wagon, for the purpose of illustrating the operation.

The supporting-frame of my device is preferably formed of the standards A A and the strut-braces A', one or both of the latter having a pin, B, projected through it or provided with a suitable latch by which to fasten the pivoted frame, presently described. The frame C is pivoted about midway its ends to the supporting-frames. To the opposite sides of the frame, at its forward end, I secure the chain D, one or both ends of which may be connected with the frame by a hook or hooks secured on the latter, so that one or the other of the links of the chain may be adjusted into engagement with the hook, in order to vary the size of the loop formed by the chain D to properly fit different-sized wagon-bodies. It is manifest that a rope may be substituted for the chain D, or that other means of securing such end of the frame to the wagon-body may be used without departing from my invention. A windlass, E, is journaled in the rear end of the pivoted frame, and is provided with one or more sockets for the lever F, by which it may be turned. A chain or cord, G, has its opposite ends secured to the windlass, one near each end thereof, and forms a loop adapted to fit under the rear end of the wagon-body.

In the use of the apparatus the front end of the pivoted frame is lowered and made fast to the forward end of the wagon-body. The loop G is then passed around the rear end of the body, when, by operating the windlass, the rear end of the body will be elevated. While the windlass may be operated by a hand-crank, I prefer to use the lever-bar F, and to secure it by turning it down against the back of the wagon-body and fastening it thereto by a hook, H, on the wagon-body. Thus the body will be raised above the running-gear and good results will be had; but I prefer to turn the body upside down, so as to throw it higher from the base or floor, and consequently more above the ground. To such end I provide a rod, I, or other suitable connection secured at one end to the extremity of lever F, and connected at its other end in the operation of the device to the rear of the running-gear, as shown, so that as the running-gear is drawn out the pivoted frame and the body will be drawn to the position shown in dotted lines, No. 1, in which position they will be held by the latch or pin B, before described.

When it is desired to replace the body on the running-gear, the latter is again connected with the rod I and backed under the pivoted frame, the latch B being released, when the parts will be moved into the dotted position No. 2, and the body may be quickly lowered onto the running-gear. A rod, J, extended transversely through the frame C, serves to hold a spring-seat, when such seat is used, by passing through its springs, as will be understood.

Having thus described my invention, what I claim, and desire to secure by Letters Patent, is—

1. In a wagon-body lifter, the pivoted frame C, provided at one end with a windlass and chains or cords, whereby to connect the said windlass and the opposite end of the frame with a wagon-body, combined with a supporting-frame, substantially as set forth.

2. The combination of the supporting-frame, the frame C, pivoted thereto, the windlass supported in one end of the frame C, and chains or cords for connecting the windlass and the opposite ends of the frame C with a wagon-body, substantially as set forth.

3. In a wagon-body lifter, the combination of the frame C, the windlass E, supported at one end of frame C, the bar F, connected with the windlass, the rod I, secured at one end to bar F, and adapted at its other end to connect with the wagon running-gear, and cords or chains D G, whereby to connect windlass E and the opposite end of the frame C with a wagon-body and the supporting-frame, substantially as set forth.

4. The combination, in a wagon-body lifter, of the supporting-frame, the frame C, pivoted between its ends to the supporting-frame, and provided at its opposite ends with chains or cords for connecting it to a wagon-body, and a latch, B, whereby to secure the frame C to the supporting-frame, substantially as set forth.

5. In a wagon-body lifter, the combination, with a frame, C, pivoted between its ends, and provided at such ends with chains or cords for connecting it with a wagon-body, of a rod, J, whereby to secure the wagon-seat, substantially as set forth.

In testimony whereof I affix my signature in presence of two witnesses.

WILLIAM H. THOMAS.

Witnesses:
ROBERT A. CREWS,
D. W. EBERSOLE.